US007630162B2

(12) United States Patent
Zhao et al.

(10) Patent No.: US 7,630,162 B2
(45) Date of Patent: Dec. 8, 2009

(54) DISK DRIVE SERVOING OFF OF FIRST HEAD WHILE DETERMINING FLY HEIGHT FOR SECOND HEAD

(75) Inventors: Hongchao Tim Zhao, San Jose, CA (US); Jiangang Liang, Sunnyvale, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 100 days.

(21) Appl. No.: 12/025,676

(22) Filed: Feb. 4, 2008

(65) Prior Publication Data

US 2009/0195936 A1 Aug. 6, 2009

(51) Int. Cl.
*G11B 21/02* (2006.01)
*G11B 27/36* (2006.01)

(52) U.S. Cl. ........................................ 360/75; 360/31

(58) Field of Classification Search ..................... None
See application file for complete search history.

(56) References Cited

U.S. PATENT DOCUMENTS 4,775,902 A 10/1988 Trovato et al.
4,777,544 A 10/1988 Brown et al.
4,839,754 A 6/1989 Gami et al.
5,130,866 A 7/1992 Klaassen et al.
5,168,413 A 12/1992 Coker et al.
5,594,595 A 1/1997 Zhu
5,742,446 A 4/1998 Tian et al.
5,909,330 A 6/1999 Carlson et al.
6,008,640 A 12/1999 Tan et al.
6,052,243 A 4/2000 Shimada
6,097,559 A 8/2000 Ottesen et al.
6,175,456 B1 1/2001 Yun
6,191,901 B1 2/2001 Carlson et al.
6,268,976 B1 7/2001 Carlson et al.
6,288,856 B1 9/2001 Ottesen et al.
6,310,740 B1 10/2001 Dunbar et al.
6,417,981 B1 7/2002 Smith
6,452,735 B1 9/2002 Egan et al.
6,459,539 B1 10/2002 Carlson et al.
6,493,169 B1 12/2002 Ferris et al.
6,501,606 B2 12/2002 Boutaghou et al.
6,519,102 B1 2/2003 Smith et al.
6,608,727 B2 8/2003 Ottesen et al.
6,611,389 B1 8/2003 Liu et al.
6,624,957 B1 9/2003 Yun
6,671,110 B2 12/2003 Baba et al.
6,674,590 B2 1/2004 Ottesen et al.
6,700,724 B2 3/2004 Knippenberg et al.
6,717,764 B2 4/2004 Lake
6,735,027 B2 5/2004 Helsel et al.
6,762,899 B2 7/2004 Ottesen et al.
6,765,745 B2 7/2004 Smith et al.
6,785,081 B2 8/2004 Chapin et al.

(Continued)

*Primary Examiner*—Andrew L Sniezek
(74) *Attorney, Agent, or Firm*—Howard H. Sheerin, Esq.

(57) ABSTRACT

A method is disclosed for selecting a dynamic fly height (DFH) control setting for a head in a disk drive, the disk drive comprising a plurality of disk surfaces and plurality of respective heads. The method comprises servoing a first head over a first disk surface in response to servo data recorded on the first disk surface, adjusting a DFH control setting for a second head, and while servoing the first head over the first disk surface, detecting whether the second head has contacted a second disk surface.

21 Claims, 6 Drawing Sheets

U.S. PATENT DOCUMENTS

| | | | |
|---|---|---|---|
| 6,798,605 | B2 | 9/2004 | Kurita et al. |
| 6,801,376 | B2 | 10/2004 | Smith |
| 6,822,816 | B2 | 11/2004 | Dakroub |
| 6,865,040 | B2 | 3/2005 | Fayeulle, et al. |
| 6,894,854 | B1 | 5/2005 | Carlson et al. |
| 6,930,844 | B2 | 8/2005 | Yeh et al. |
| 6,980,383 | B2 | 12/2005 | Brunnett et al. |
| 7,016,131 | B2 | 3/2006 | Liu et al. |
| 7,023,647 | B2 | 4/2006 | Bloodworth et al. |
| 7,038,875 | B2 | 5/2006 | Lou et al. |
| 7,046,463 | B2 | 5/2006 | Gay Sam et al. |
| 7,068,449 | B2 | 6/2006 | Riddering et al. |
| 7,068,451 | B1 | 6/2006 | Wang et al. |
| 7,068,457 | B2 | 6/2006 | Riddering et al. |
| 7,092,195 | B1 | 8/2006 | Liu et al. |
| 7,095,578 | B2 | 8/2006 | Ma |
| 7,158,325 | B1 | 1/2007 | Hu et al. |
| 7,180,692 | B1 | 2/2007 | Che, et al. |
| 7,265,933 | B1 | 9/2007 | Phan et al. |
| 7,376,182 | B2 | 5/2008 | Kris |
| 2002/0167745 | A1 | 11/2002 | Ottesen |
| 2003/0002183 | A1 | 1/2003 | Fioravanti |
| 2003/0184899 | A1 | 10/2003 | Gay Sam et al. |
| 2003/0184907 | A1 | 10/2003 | Li et al. |
| 2003/0218813 | A1 | 11/2003 | Dakroub |
| 2004/0075940 | A1 | 4/2004 | Bajorek et al. |
| 2005/0128630 | A1 | 6/2005 | Huang et al. |
| 2006/0146437 | A1* | 7/2006 | Khurshudov et al. .......... 360/75 |
| 2006/0268445 | A1 | 11/2006 | Brannon et al. |
| 2007/0127148 | A1 | 6/2007 | Yokohata et al. |

* cited by examiner $$\text{MIN } G \text{ for } \sum_{i=1}^{N} (GL_i - P_i)^2 \cdots\cdots\rightarrow G = \frac{\sum_{i=1}^{N} P_i L_i}{\sum_{i=1}^{N} L_i^2}$$

DISK DRIVE SERVOING OFF OF FIRST HEAD WHILE DETERMINING FLY HEIGHT FOR SECOND HEAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $\mathbf{6}_o$-$\mathbf{6}_N$ recorded around the circumference of each data track. Each servo sector $\mathbf{6}_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $\mathbf{6}_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The servo sectors $\mathbf{6}_0$-$\mathbf{6}_N$ may be written to the disk using any suitable technique, such as with an external servo writer or self-servo written by the disk drive. In one embodiment, seed tracks are written to the disk (e.g., spiral seed tracks are written using an external spiral writer or media writer) which are processed in order to write the servo sectors $\mathbf{6}_0$-$\mathbf{6}_N$ to the disk. When writing the servo sectors to the disk, an air bearing forms between the head and the disk due to the disk rotating at high speeds. Since the quality of the write/read signal depends on the fly height of the head, conventional heads (e.g., magnetoresistive heads) may comprise a dynamic fly height (DFH) controller, such as a heater which controls the fly height through thermal expansion or a piezoelectric (PZT) actuator. It is therefore desirable to determine the appropriate DFH control setting (e.g., appropriate current applied to the heater or PZT actuator) that achieves the target fly height for the heads before writing the servo sectors to the disk.

DETAILED DESCRIPTION OF EMBODIMENTS OF THE INVENTION

Figure 2A:
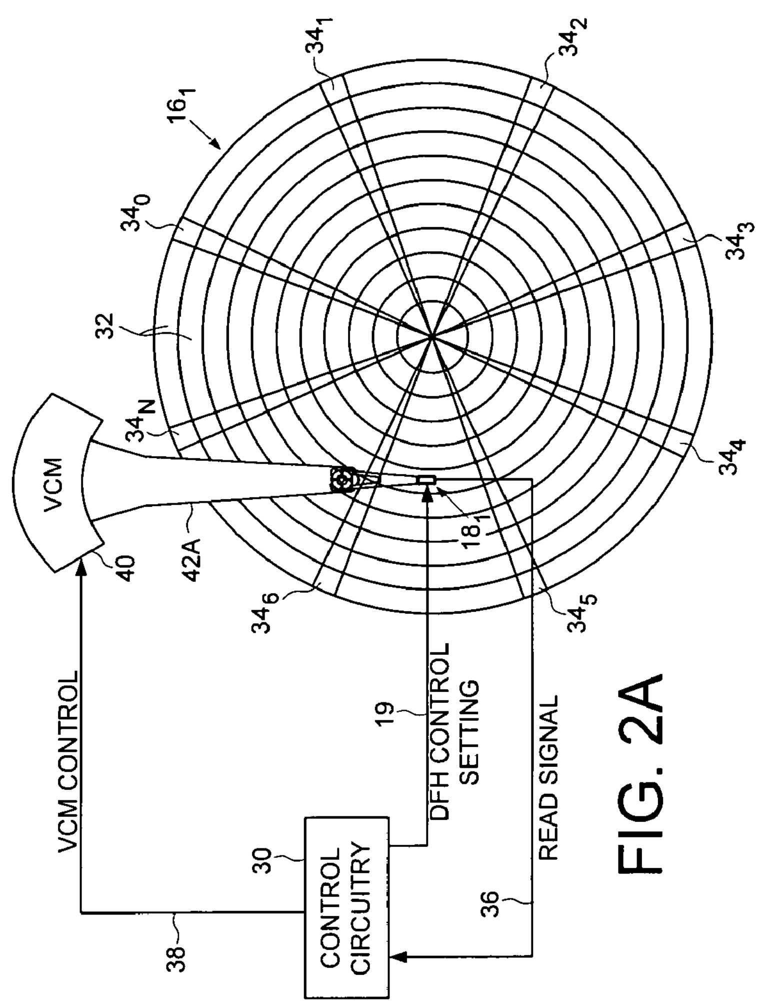
FIG. 2A shows a disk drive according to an embodiment of the present invention comprising a plurality of heads actuated over a plurality of disk surfaces, and control circuitry.
Figure 2B:
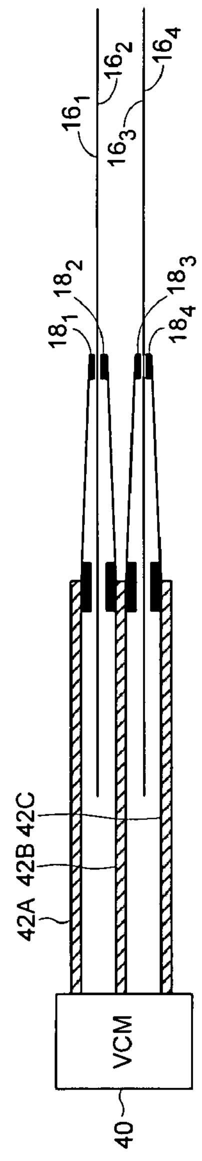
FIG. 2B shows a side view of the disk drive, including the plurality of heads actuated over respective disk surfaces.

FIGS. 2A and 2B show a disk drive according to an embodiment of the present invention comprising a plurality of disk surfaces $\mathbf{16}_1$-$\mathbf{16}_4$ and a plurality of heads $\mathbf{18}_1$-$\mathbf{18}_4$ actuated over the respective disk surfaces $\mathbf{16}_1$-$\mathbf{16}_4$. A dynamic fly height (DFH) control setting 19 is selected for a second head by executing the flow diagram of FIG. 2C. A first head is servoed over a first disk surface in response to servo data recorded on the first disk surface (step 20). A DFH control setting is initialized for a second head (step 22), and while servoing the first head over the first disk surface, a contact metric is generated (step 24) for detecting whether the second head has contacted a second disk surface (step 26). If the second head has not contacted the second disk surface (step 26), then the DFH control setting is adjusted (step 28) until the second head contacts the second disk surface (step 26).

Figure 2C:
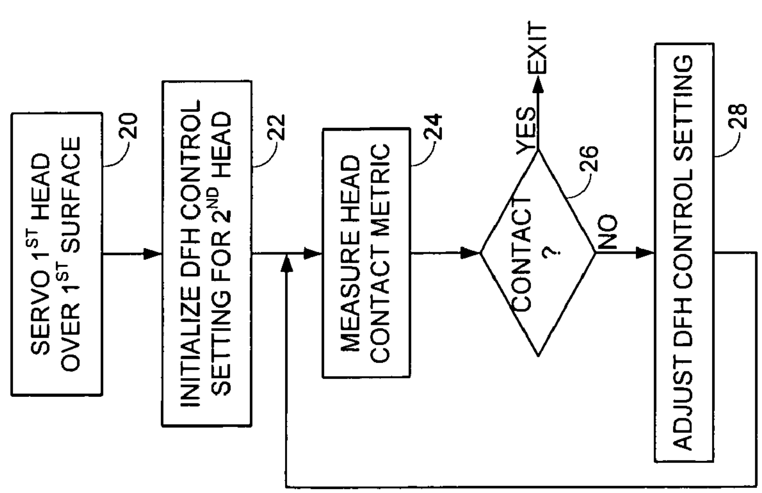
FIG. 2C is a flow diagram for selecting a dynamic fly height (DFH) control setting for a second head while servoing off of a first head.

The flow diagram of FIG. 2C may be implemented in any suitable manner, such as by a test station connected to the disk drive. In another embodiment, control circuitry 30 within the disk drive executes the flow diagram of FIG. 2C in order to select the DFH control setting for each head $\mathbf{18}_1$-$\mathbf{18}_4$.

In the embodiment of FIG. 2A, each disk surface $\mathbf{16}_1$-$\mathbf{16}_4$ comprises a plurality of data tracks 32 defined by a plurality of embedded servo sectors $\mathbf{34}_0$-$\mathbf{34}_N$. The control circuitry 30 processes the read signal 36 emanating from the head $\mathbf{18}_1$ to demodulate the servo sectors $\mathbf{34}_0$-$\mathbf{34}_N$ and generate a position error signal (PES) representing an error between the actual position of the head and a target position relative to a target data track. The control circuitry 30 filters the PES using a suitable compensation filter to generate a control signal 38 applied to a voice coil motor (VCM) 40 which rotates an actuator arm 42A about a pivot in order to actuate the head $\mathbf{18}_1$ radially over the disk in a direction that reduces the PES.

Any suitable technique may be employed to detect whether a head has contacted the disk surface (step 26 of FIG. 2C). Suitable techniques include monitoring changes in the position error signal (PES) in the servo system, monitoring the read signal when reading data from the disk surface, monitoring the rotation speed of the disks, monitoring the spindle motor driving current, or monitoring a suitable sensor, such as a piezoelectric sensor integrated with the head. In addition, the fly height of the head may be adjusted (step 28 of FIG. 2C) using any suitable technique, such as by adjusting a heater which controls the fly height through thermal expansion, or by adjusting a piezoelectric (PZT) actuator integrated with the head which adjusts the fly height mechanically. The DFH control setting may also comprise any suitable signal, such as a linear signal or pulse width modulated signal, and the DFH control setting may adjust any suitable power component, such as current or voltage.

The embodiments of the present invention may be employed in any suitable application associated with the manufacture and/or normal operation of a disk drive. In one embodiment, a plurality of disk surfaces are servo written by servoing off of a first disk surface while bank servo writing all disk surfaces. Prior to bank servo writing, a target DFH control setting is determined for each head by servoing a first head over the first disk surface and detecting when each head contacts its respective disk surface. Each head is then configured with a corresponding target DFH control setting for bank servo writing their respective disk surface.

Figure 3A:
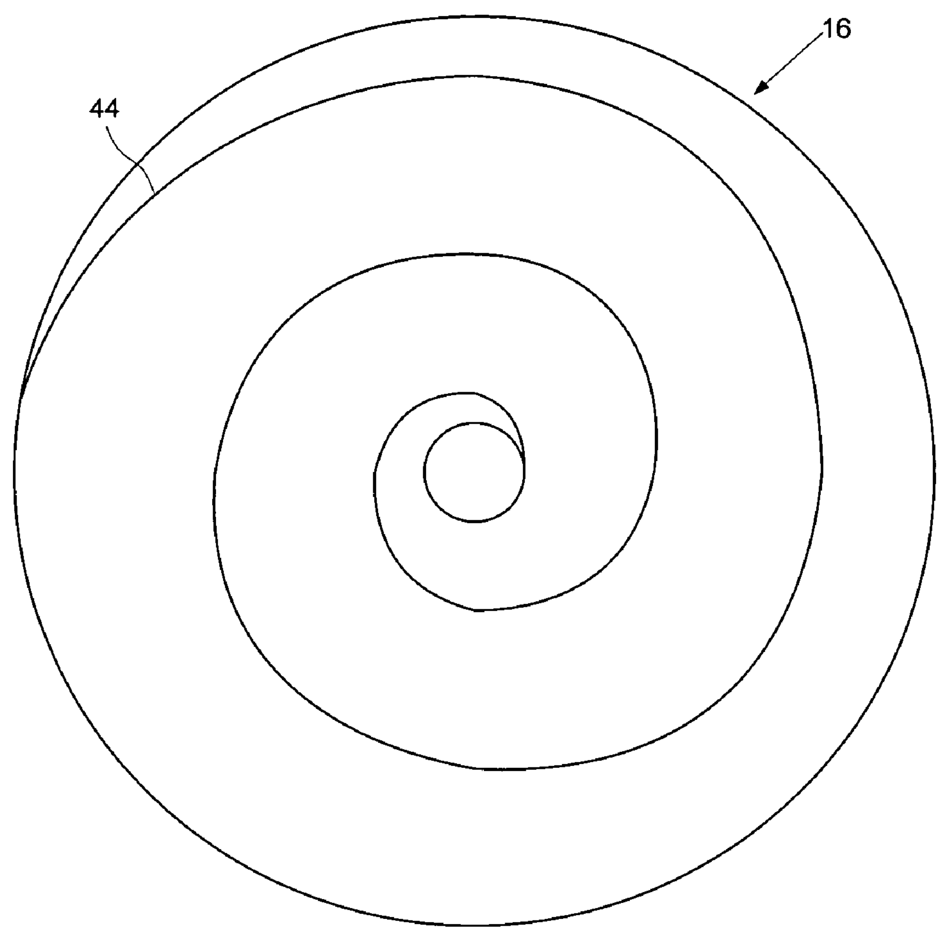
FIG. 3A shows an embodiment of the present invention wherein servo data recorded on a first disk surface comprises a spiral track.
Figure 3B:
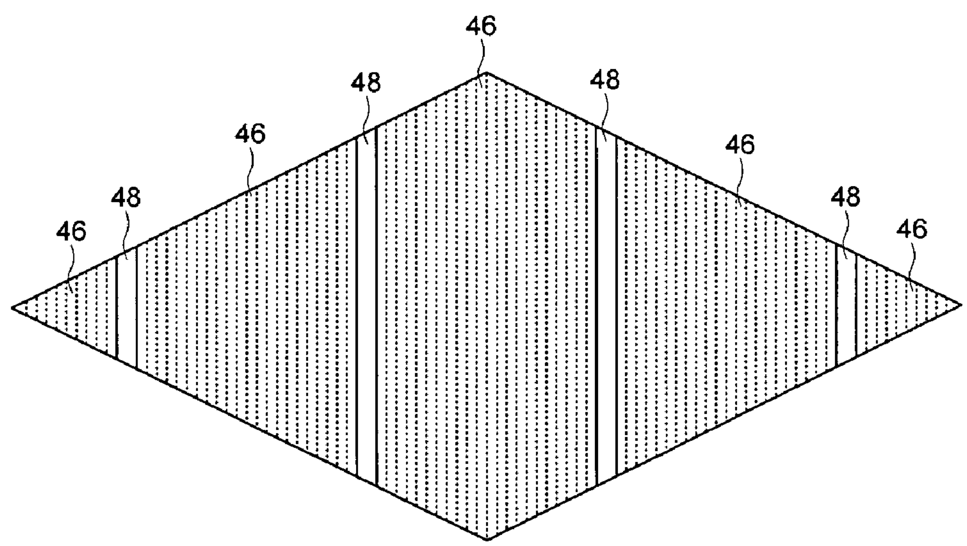
FIG. 3B shows an envelope of a track crossing signal generated as the head passes over a spiral track.

In one embodiment, a plurality of spiral tracks are written to a first disk surface, wherein an example spiral track 44 is shown in FIG. 3A. Each spiral track 44 comprises a high frequency signal interrupted by a sync mark at a sync mark interval. When the head passes over a spiral track 44, an envelope of a read signal shown in FIG. 3B is generated comprising the high frequency signal 46 interrupted by sync marks 48. When the head moves in the radial direction, the envelope will shift (left or right) while the sync marks 48 remain fixed. The shift in the envelope (detected from the high frequency signal 46) relative to the sync marks 48 provides the off-track information (position error signal or PES) for servoing the head.

Figure 1:
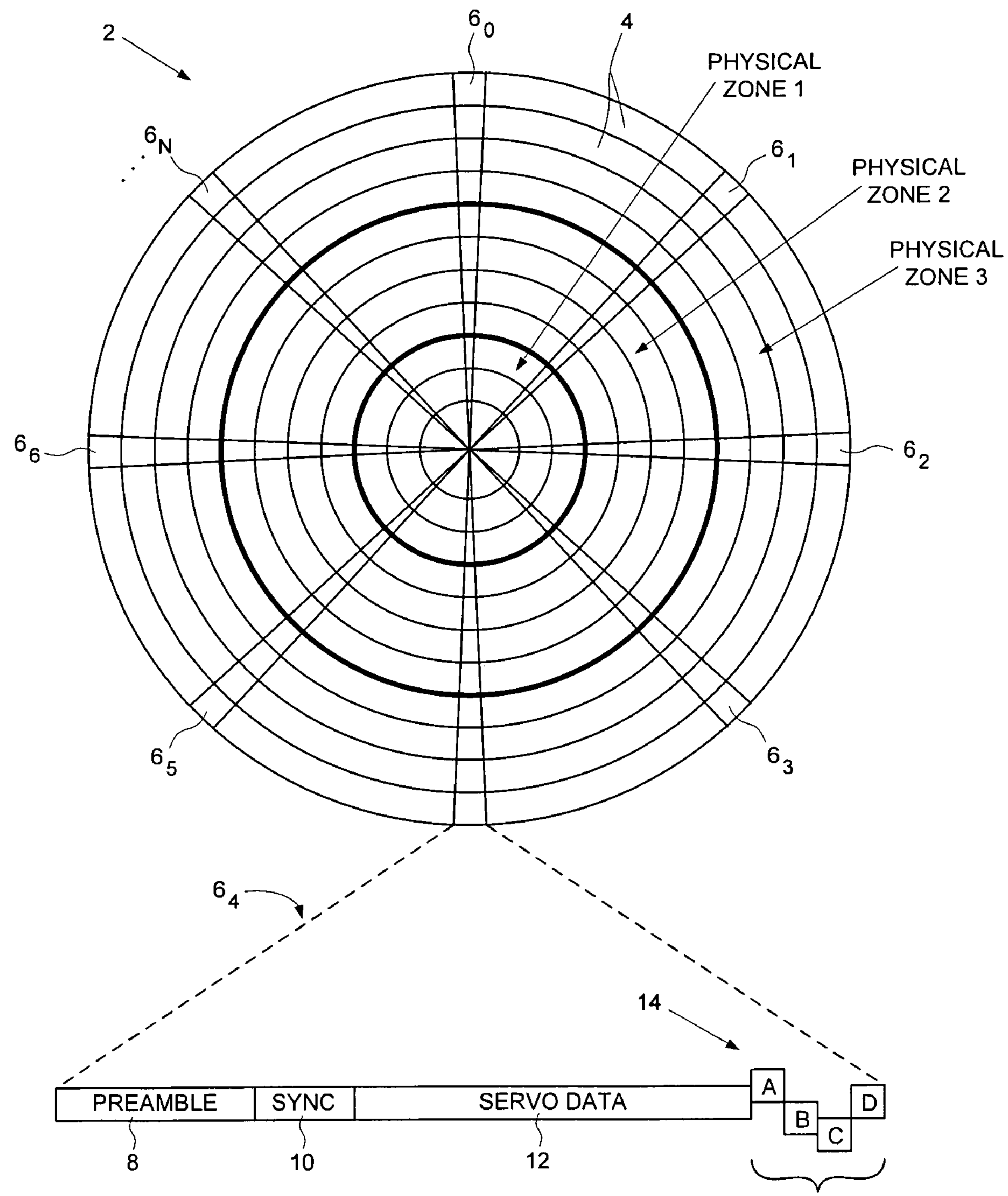
FIG. 1 shows a prior art disk format comprising a plurality of data tracks defined by a plurality of servo sectors.

In one embodiment, the spiral tracks written to the first disk surface are read by a first head and used to servo all of the heads while bank servo writing all disk surfaces with conventional product servo sectors (FIG. 1). Prior to bank servo writing, a target DFH control setting is determined for each head by servoing a first head over the first disk surface in response to the spiral tracks, and detecting when each head contacts its respective disk surface.

Figure 4:
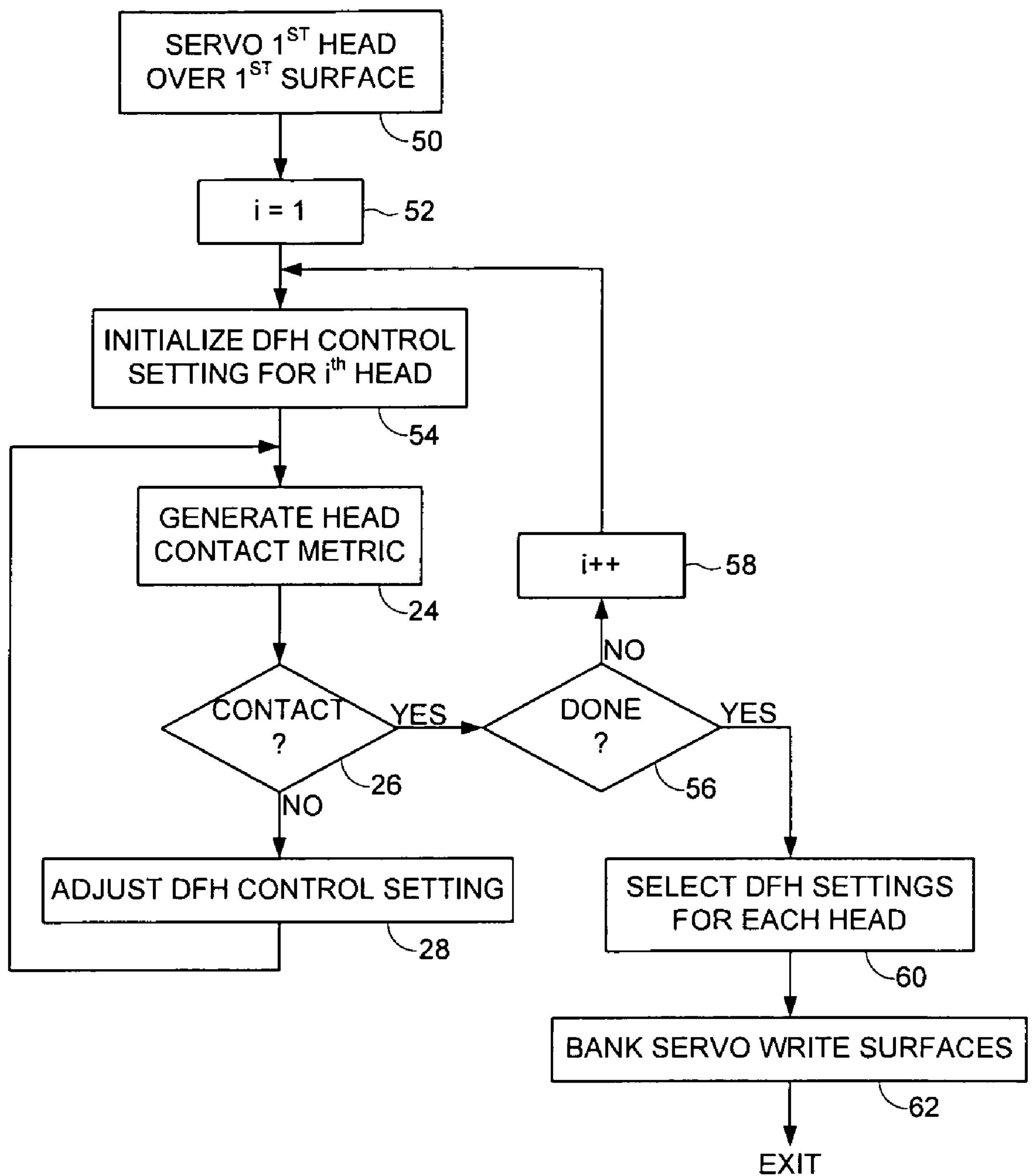
FIG. 4 is a flow diagram according to an embodiment of the present invention wherein the DFH control settings selected for each head while servoing off of a first head are then used to bank servo write the disk surfaces.

FIG. 4 is a flow diagram according to an embodiment of the present invention for bank servo writing the plurality of disk surfaces. A first head is servoed over a first disk surface (step 50) and an counter i is initialized to 1 (step 52). The DFH control setting is initialized for the $i^{th}$ head (step 54), for example, by initializing the DFH control setting to a setting that corresponds to the maximum fly height. A contact metric is generated (step 24) for detecting whether the $i^{th}$ head has contacted its respective disk surface (step 26). If the $i^{th}$ head has not contacted its respective disk surface (step 26), then the DFH control setting for the $i^{th}$ head is adjusted (step 28) until the $i^{th}$ head contacts its respective disk surface (step 26). If after the $i^{th}$ head contacts its respective disk surface (step 26) there are more heads to calibrate (step 56), then the counter i is incremented (step 58) and the process is repeated for the next head while servoing the first head over the first disk surface.

After determining the DFH control setting that causes each head to contact its respective disk surface, an operating DFH control setting is selected for each head (step 60). In one embodiment, the operating DFH control setting for each head is selected by subtracting a margin from the setting that caused the head to contact its respective disk surface. Once the operating DFH control setting has been selected for each head, all of the disk surfaces may be bank servo written with suitable servo data (step 62). For example, in the embodiment described above, all of the disk surfaces may be bank servo written with conventional product servo sectors (FIG. 1) while servoing the first head off of spiral tracks recorded on the first disk surface.

Figure 5:
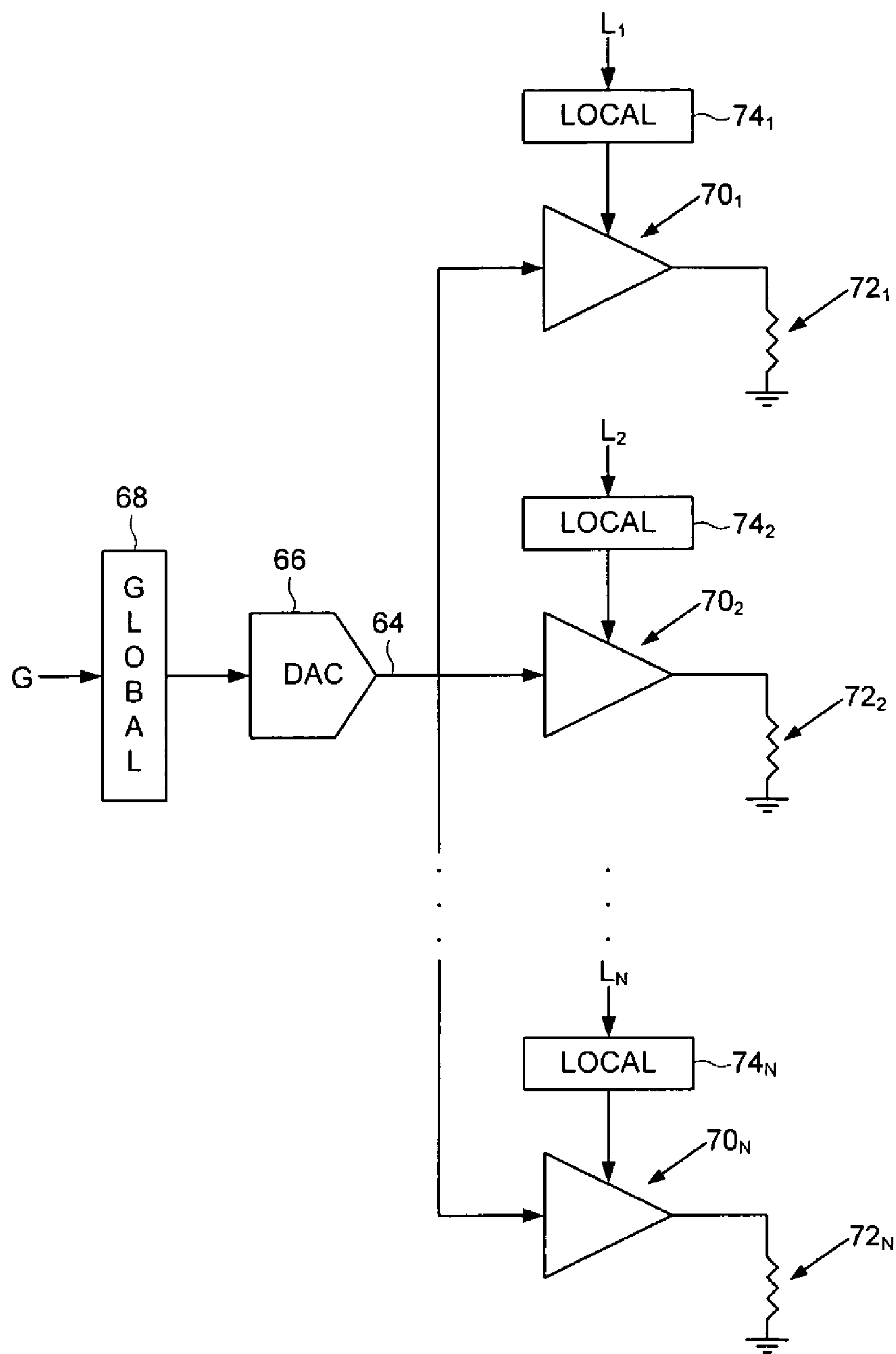
FIG. 5 shows control circuitry according to an embodiment of the present invention comprising a global digital-to-analog setting and local scalars for scaling the global setting for each head.

FIG. 5 shows control circuitry according to an embodiment of the present invention for selecting the DFH control setting for each head. A global digital-to-analog setting 64 is generated by a digital-to-analog converter (DAC) 66 in response to a digital value G programmed into a register 68. The global digital-to-analog setting 64 is then amplified by a plurality of amplifiers $\mathbf{70}_1$-$\mathbf{70}_N$ for generating control signals applied to respective DFH controllers $\mathbf{72}_1$-$\mathbf{72}_N$ for adjusting the fly height of respective heads. The gain of each amplifier $\mathbf{70}_1$-$\mathbf{70}_N$ is configured by a digital scalar value $L_i$ stored in a respective register $\mathbf{74}_1$-$\mathbf{74}_N$.

In one embodiment, a calibration procedure is executed to select the global digital-to-analog setting relative to the available scalar settings $L_i$ and the DFH control setting determined for each head. The DFH control setting for a particular head is determined in one embodiment by setting its scalar value $L_i$ to one and then finding the global digital-to-analog setting that causes the head to contact its respective disk surface. This embodiment is understood with reference to the flow diagram of FIG. 6A wherein a first head is servoed over a first disk surface (step 76) while finding the global digital-to-analog setting that causes head/disk contact for each head. A counter i is initialized to one (step 78), the global digital-to-analog setting is initialized, the scalar $L_i$ for the $i^{th}$ head is set to one, and the scalar $L_{<>i}$ for all other heads is set to zero (step 80). A contact metric is generated (step 82) for detecting whether the $i^{th}$ head has contacted its respective disk surface (step 84). If the $i^{th}$ head has not contacted its respective disk surface (step 84), then the global digital-to-analog setting G is incremented (step 86) until the $i^{th}$ head contacts its respective disk surface (step 84). After the $i^{th}$ head contacts its respective disk surface, an operating setting $P_i$ is saved for the $i^{th}$ head (step 88), such as by subtracting a margin M from the current global digital-to-analog setting G. If after the $i^{th}$ head contacts its respective disk surface (step 84) there are more heads to calibrate (step 90), then the counter i is incremented (step 92) and the process is repeated for the next head while servoing the first head over the first disk surface.

After determining the global digital-to-analog setting G that causes each head to contact its respective disk surface, a scalar setting $L_i$ is selected for each head (step 94). In one embodiment, the scalar settings $L_i$ are selected relative to the operating settings $P_i$ selected for each head (step 88). Consider an example where the operating settings $P_i$ for four heads is determined to be:

[108, 93, 95, 135]

and the available scalar settings are:

[1, 0.865, 0.701, 0.5].

Normalizing each operating setting $P_i$ relative to the available scalar settings provides:

[0.8, 0.6889, 0.7037, 1].

Selecting an available scalar setting $L_i$ for each operating setting $P_i$ that is closest to the normalized value provides:

[0.865, 0.701, 0.701, 1].

Figures 6A, 6B:
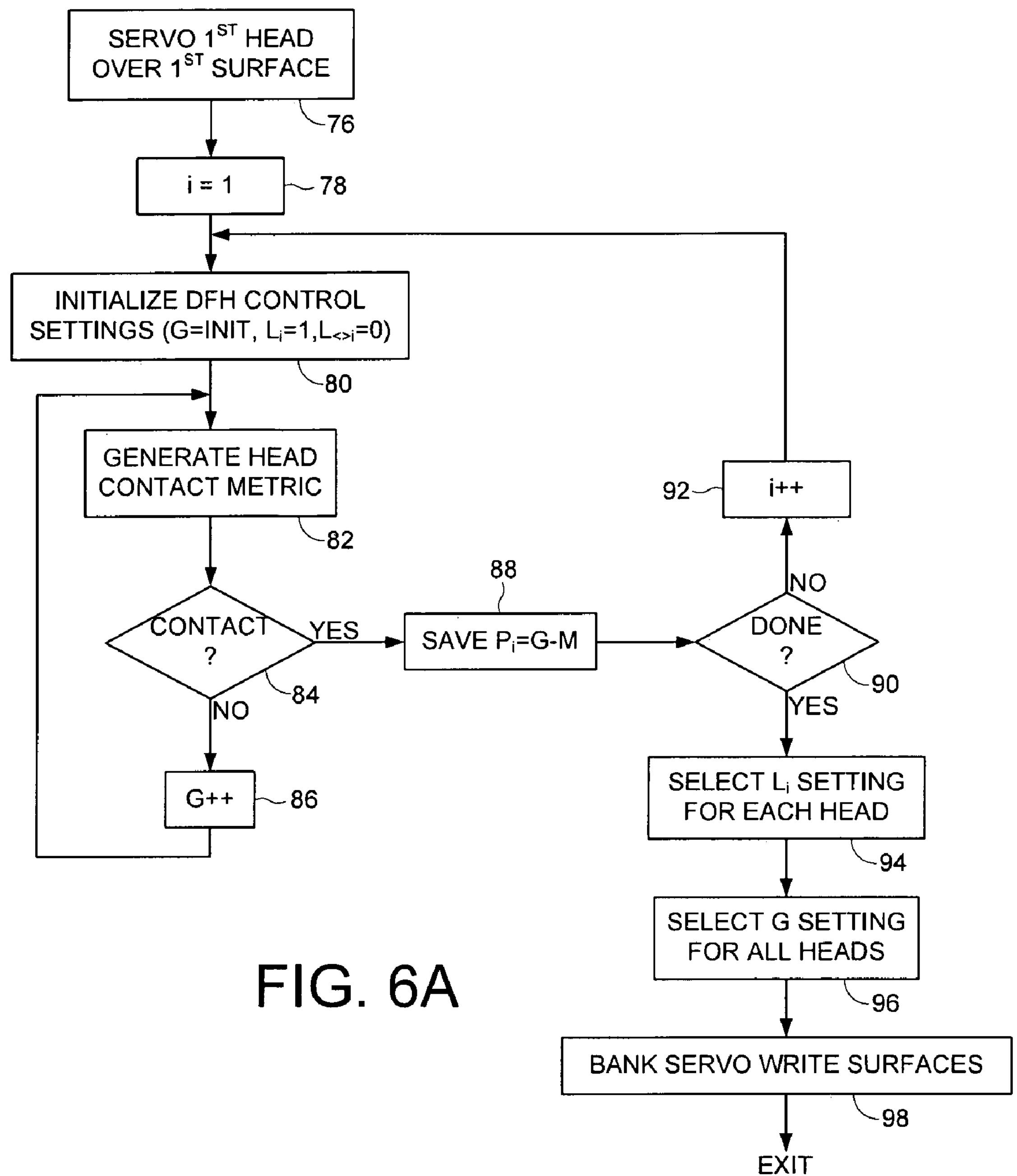
FIG. 6A is a flow diagram according to an embodiment of the present invention for selecting an optimal global digital-to-analog setting for all of the heads after selecting a local scalar setting for each head.
FIG. 6B shows an equation according to an embodiment of the present invention for generating the global digital-to-analog setting.

Once the scalar settings $L_i$ have been selected, an optimal global digital-to-analog setting G is determined (step 96) by finding the setting that minimizes the following equation:

$$\sum_{i=1}^{N}(GL_i - P_i)^2$$

where the solution to the above equation is shown in FIG. 6B.

After finding the optimal global digital-to-analog setting G, the register 68 of FIG. 5 is programmed accordingly and the scalar registers $74_1$-$74_N$ are programmed with the scalar settings $L_i$ that correspond to the normalized operating settings $P_i$ described above. All of the disk surfaces are then bank servo written (step 98), for example, while servoing the first head off of spiral tracks recorded on the first disk surface.

The above embodiment for determining an optimal global digital-to-analog setting G for DFH control can be applied to other control signals for the heads. For example, the flow diagram of FIG. 6A may be executed for the write current applied to the write element of the heads, or a bias current applied to a read element of the heads. The write current may be generated concurrently for multiple heads during the bank servo write operation, or during normal operation if the disk drive is capable of concurrently writing user data to multiple disk surfaces. Similarly, the bias current may be generated concurrently for multiple heads in order to read data from multiple disk surfaces. In one embodiment, the control circuitry of FIG. 5 is duplicated so that multiple control settings may be configured concurrently (e.g., DFH control setting and write current control setting). In yet another embodiment, the circuitry of FIG. 5 may be demultiplexed into an appropriate control signal (e.g., write current or bias current) so that the circuitry may be shared.

The control circuitry for implementing the flow diagrams may comprise any suitable circuitry, such as any suitable integrated circuit or circuits, a microprocessor executing instructions of a control program, etc. In the embodiment where the control circuitry 30 within each disk drive implements the flow diagrams, the control circuitry 30 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 30 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on.

What is claimed is:

1. A method of selecting a dynamic fly height (DFH) control setting for a head in a disk drive, the disk drive comprising a plurality of disk surfaces and plurality of respective heads, the method comprising:

servoing a first head over a first disk surface in response to servo data recorded on the first disk surface;

adjusting a first DFH control setting for a second head; and while servoing the first head over the first disk surface, detecting whether the second head has contacted a second disk surface.

2. The method as recited in claim 1, further comprising selecting an operating DFH control setting for the second head in response to the adjusted first DFH control setting.

3. The method as recited in claim 2, further comprising:

adjusting a second DFH control setting for a third head; and while servoing the first head over the first disk surface, detecting whether the third head has contacted a third disk surface.

4. The method as recited in claim 3, further comprising selecting an operating DFH control setting for the second head and an operating DFH control setting for the third head in response to the adjusted first DFH control setting and the adjusted second DFH control setting.

5. The method as recited in claim 4, further comprising bank servo writing the second and third disk surfaces using the operating DFH control settings for the second and third heads.

6. The method as recited in claim 2, wherein selecting the operating DFH control setting for the second head comprises:

selecting a digital-to-analog setting for generating a first signal; and selecting a scalar setting for amplifying the first signal.

7. The method as recited in claim 3, wherein:

adjusting the first DFH control setting for the second head comprises adjusting a digital-to-analog setting for generating a first signal; and adjusting the second DFH control setting for the third head comprises adjusting the digital-to-analog setting for generating a second signal.

8. The method as recited in claim 7, further comprising:

selecting a first scalar setting for amplifying the first signal;

selecting a second scalar setting for amplifying the second signal; and selecting a global digital-to-analog setting in response to the adjusted first DFH control setting, the adjusted second DFH control setting, the first scalar setting, and the second scalar setting.

9. The method as recited in claim 8, wherein selecting the global digital-to-analog setting comprises minimizing an equation:

$$\sum_{i=1}^{N}(GL_i - P_i)^2$$

where:

N is a total number of heads in the disk drive;

G is the global digital-to-analog setting;

$P_i$ is the adjusted DFH control setting for the $i^{th}$ head; and $L_i$ is the scalar setting for the $i^{th}$ head.

10. The method as recited in claim 1, wherein the servo data comprises a plurality of spiral tracks recorded on the first disk surface.

11. A disk drive comprising:

a plurality of disk surfaces;

a plurality of heads actuated over the respective disk surfaces; and control circuitry operable to select a dynamic fly height (DFH) control setting for a second head by:

servoing a first head over a first disk surface in response to servo data recorded on the first disk surface;

adjusting a first DFH control setting for the second head; and while servoing the first head over the first disk surface, detecting whether the second head has contacted a second disk surface.

12. The disk drive as recited in claim 11, wherein the control circuitry is further operable to select an operating DFH control setting for the second head in response to the adjusted first DFH control setting.

13. The disk drive as recited in claim 12, wherein the control circuitry is further operable to:

adjust a second DFH control setting for a third head; and while servoing the first head over the first disk surface, detect whether the third head has contacted a third disk surface.

14. The disk drive as recited in claim 13, wherein the control circuitry is further operable to select an operating DFH control setting for the second head and an operating DFH control setting for the third head in response to the adjusted first DFH control setting and the adjusted second DFH control setting.

15. The disk drive as recited in claim 14, wherein the control circuitry is further operable to bank servo write the second and third disk surfaces using the operating DFH control settings for the second and third heads.

16. The disk drive as recited in claim 12, wherein selecting the operating DFH control setting for the second head comprises:

selecting a digital-to-analog setting for generating a first signal; and selecting a scalar setting for amplifying the first signal.

17. The disk drive as recited in claim 13, wherein:

adjusting the first DFH control setting for the second head comprises adjusting a digital-to-analog setting for generating a first signal; and adjusting the second DFH control setting for the third head comprises adjusting the digital-to-analog setting for generating a second signal.

18. The disk drive as recited in claim 17, wherein the control circuitry is further operable to:

select a first scalar setting for amplifying the first signal;

select a second scalar setting for amplifying the second signal; and select a global digital-to-analog setting in response to the adjusted first DFH control setting, the adjusted second DFH control setting, the first scalar setting, and the second scalar setting.

19. The disk drive as recited in claim 18, wherein selecting the global digital-to-analog setting comprises minimizing an equation:

$$\sum_{i=1}^{N}(GL_i - P_i)^2$$

where:

N is a total number of heads in the disk drive;

G is the global digital-to-analog setting;

$P_i$ is the adjusted DFH control setting for the $i^{th}$ head; and $L_i$ is the scalar setting for the $i^{th}$ head.

20. The disk drive as recited in claim 11, wherein the servo data comprises a plurality of spiral tracks recorded on the first disk surface.

21. A disk drive comprising:

a plurality of disk surfaces;

a plurality of heads actuated over the respective disk surfaces; and control circuitry operable to select a global digital-to-analog setting for the plurality of heads by:

adjusting a first digital-to-analog setting for a first head to generate a first signal;

adjusting a second digital-to-analog setting for a second head to generate a second signal;

selecting a first scalar setting for scaling the first signal;

selecting a second scalar setting for scaling the second signal; and selecting the global digital-to-analog setting in response to the adjusted first digital-to-analog setting, the adjusted second digital-to-analog setting, the first scalar setting, and the second scalar setting, wherein the global digital-to-analog setting comprises a dynamic fly height (DFH) control setting.

* * * * *